United States Patent [19]

Martin

[11] 4,436,117
[45] Mar. 13, 1984

[54] LEAK RESISTANT PLUG ASSEMBLY

[76] Inventor: John E. Martin, Penllyn Pike, Springhouse, Pa. 19477

[21] Appl. No.: 446,153

[22] Filed: Dec. 2, 1982

[51] Int. Cl.³ .......................................... F16L 55/12
[52] U.S. Cl. ........................................ 138/89; 165/76
[58] Field of Search ................... 29/402.14, 402.15; 138/89, 90, 91, 92; 165/71, 76; 215/360; 220/236, 237; 411/2, 3, 5; 411/44, 55, 70, 71, 72

[56] References Cited

U.S. PATENT DOCUMENTS

| | | | |
|---|---|---|---|
| 120821 | 0/1871 | Lowe | 215/360 |
| 605,125 | 0/1898 | Nutt | 215/360 |
| 2,092,358 | 9/1937 | Robertson | 285/213 |
| 2,856,963 | 10/1958 | Hoerter | 138/89 |
| 3,135,414 | 6/1964 | Lee | 138/89 X |
| 3,525,365 | 8/1970 | Meulendyk | 138/89 |
| 3,825,146 | 7/1974 | Hirmann | 220/234 |
| 4,091,841 | 5/1978 | Beneker et al. | 138/89 |
| 4,114,654 | 9/1978 | Richardson | 138/89 |
| 4,140,040 | 2/1979 | Modrey | 138/89 X |
| 4,203,185 | 5/1980 | Beyer et al. | 165/71 X |
| 4,237,937 | 12/1980 | Healy, Sr. | 138/97 |
| 4,303,101 | 12/1981 | Tholen | 138/89 |
| 4,390,042 | 6/1983 | Kucherer et al. | 165/71 X |

FOREIGN PATENT DOCUMENTS 1955005 10/1969 Fed. Rep. of Germany ........ 138/89
1133724 10/1955 France ............................. 215/360

OTHER PUBLICATIONS

Technical Hydraulic Handbook, 5th Edition, 1980, Lee.

*Primary Examiner*—Stephen Marcus
*Assistant Examiner*—Mark Thronson
*Attorney, Agent, or Firm*—Howson and Howson

[57] ABSTRACT

A plug assembly which is resistant to loosening in response to thermal expansion and contraction is provided. The plug assembly comprises a deformable sleeve which is closed at one end and open at its opposite end to provide a chamber which receives a wedge slidable with respect to an expandable ring mounted in the chamber adjacent its open end. When pulled axially, the wedge expands the ring which, in turn, expands the sleeve radially outward into engagement with the inner wall of the item to be plugged. A retainer surrounds the out-pulled wedge and cooperates with a nut and threads on the wedge to tension the same and thereby apply continuous outward pressure to the sleeve. Preferably, the outer periphery of the sleeve is provided with a series of alternating edges and grooves which cut through any scale which may be present on the inner surface of the plugged item.

13 Claims, 4 Drawing Figures

LEAK RESISTANT PLUG ASSEMBLY

FIELD OF THE INVENTION

The present invention relates to expandable plugging devices, and more particularly, the present invention relates to an expandable plug assembly which is particularly suited for use in plugging tubes such as may be found in heat exchangers associated with nuclear power generating facilities.

BACKGROUND OF THE INVENTION

In copending application Ser. No. 214,189, filed on Dec. 8, 1980 and entitled "Method and Apparatus for Repairing Heat Exchanger," now U.S. Pat. No. 4,393,564, there is disclosed an expandable plug assembly and associated actuating apparatus for use in installing the plug assembly in a heat exchanger tube. The plug assembly comprises a radially deformable sleeve adapted to be placed in the tube of a heat exchanger in alignment with its tube sheet and an elongated wedge slidably received within the sleeve for expanding the sleeve outwardly when pulled axially relative to the sleeve. A breakaway member is mounted at the narrow end of the wedge and is connected to a pull rod which cooperates with a compression tube engaging the sleeve to pull the wedge into the sleeve and expand it outwardly to provide a fluid tight joint. After a predetermined amount of outward pressure has been applied, the breakaway ruptures to permit removal of the pull rod and compression tube from within the plugged tube.

In U.S. application Ser. No. 311,912, filed on Oct. 16, 1981 and entitled "Plug Assembly For Use in Method and Apparatus for Repairing Heat Exchangers," there is disclosed an expandable plug assembly which is particularly suited for use in providing a fluid tight joint in a heat exchanger having a tube which may have a substantial amount of corrosion on its inner surface. The plug assembly in this application is characterized by a plurality of alternating cutting edges and grooves on the periphery of the plugged sleeve. The cutting edges sever the scale and displace it into the grooves when installed in the manner described in the previously mentioned application.

While each of the aforementioned plug assemblies and associated placement apparatus functions entirely satisfactory for its intended purpose, it has been found that in certain situations there may be a tendency for the plugs to loosen and thereby permit leakage. For instance, in heat exchangers associated with nuclear power plants, it is customary for the repaired portion of the heat exchanger to be stress relieved after repair work has been performed. In stress relieving the affected portion, heat is applied at temperatures which can cause the installed plug to loosen when the heat exchanger is subsequently placed in service. Because of this possibility, there is a demand for a plug assembly which is resistant to loosening even when subjected to distortions caused by thermal expansion and contraction.

OBJECTS OF THE INVENTION

With the foregoing in mind, a primary object of the present invention is to provide a novel expandable plug assembly which is resistant to leaking.

It is another object of the present invention to provide an improved plug assembly which maintains a fluid tight seal with its surrounding structure even though subjected to dimensional distortions caused by thermal expansion and contraction.

As a further object, the present invention provides a unique plug assembly which has a minimum number of potential leak paths and which is capable of providing a leak resistant joint in a tube having interior scale.

A still further object of the present invention is to provide a novel expandable plug assembly which is particularly suited for use in plugging the tubes of heat exchangers used in nuclear power plants.

SUMMARY OF THE INVENTION

More specifically, the present invention provides a plug assembly which affords desirable sealing capabilities over a wide range of conditions. The plug assembly comprises a sleeve having an endwall and an integral deformable sidewall cooperating with the endwall to form a chamber closed at one end and open at the other. A wedge is mounted within the chamber and is slidably received within an expandable ring mounted in the sleeve adjacent its open end. When pulled axially relative to the ring, the wedge causes the sleeve to expand radially into fluid tight engagement with a surrounding surface, such as the inside of a tube. A tubular retainer surrounds the out-pulled wedge and has one end which engages the ring and an opposite end which is engaged by a rotary member threadedly connected to the wedge. By turning the rotary member, the wedge is tensioned for maintaining continuous outward sealing pressure against the inside of the tube over a wide range of conditions which might tend to loosen the plug assembly. Preferably, the outer periphery of the sleeve is provided with a series of alternating edges and grooves adjacent its open end for cutting and containing any scale which may exist on the inner periphery of the plugged tube.

BRIEF DESCRIPTION OF THE DRAWINGS

The foregoing and other objects, features and advantages of the present invention should become apparent from the following description when taken in conjuction with the accompanying drawings, in which.

DESCRIPTION OF THE PREFERRED EMBODIMENT

Figure 1:
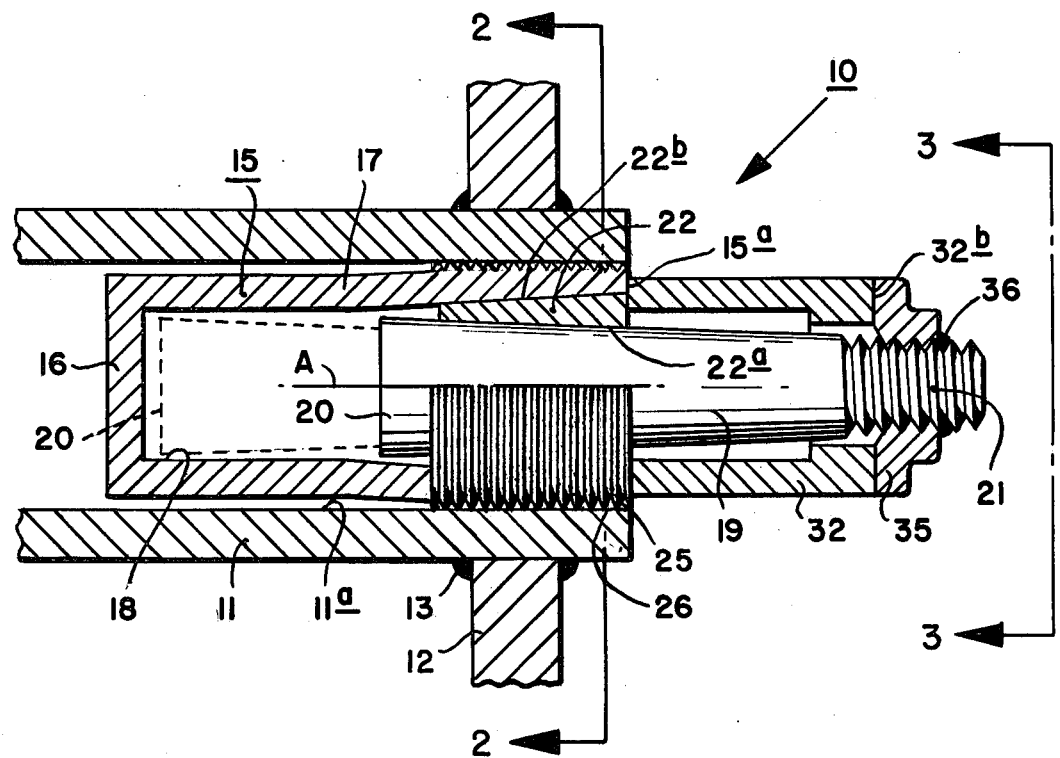
FIG. 1 is a longitudinal sectional view of a plug assembly embodying the present invention and shown installed in one end of a tube of a heat exchanger.

Referring now to the drawings, FIG. 1 illustrates a plug assembly 10 which embodies the present invention. The plug assembly 10 is illustrated plugging one end of a tube 11 such as may be mounted with a series of like tubes between tube sheets, such as the tube sheet 12, in a heat exchanger. Customarily, the tubes are fastened to the tube sheets by weldments, such as the weldments 13 extending around the periphery of the tube 11 on opposite sides of the tube sheet 12.

The plug assembly is radially deformable into fluid tight engagement with the tube 11. For this purpose, the plug assembly 10 comprises a sleeve 15 having an endwall 16 and a deformable tubular sidewall 17 which cooperates with the endwall 16 to define a chamber 18 which is closed at one end by the endwall 16 and which is open at its opposite end 15a. An elongated frustoconical wedge 19 is contained within the chamber 18 and, when initially installed, is disposed with its base or large end 20 confronting the endwall 16 of the sleeve 15 in the manner illustrated in phantom lines in FIG. 1. For purposes to be described, the smaller end of the wedge 19 is provided with gripping means which, in the embodiment illustrated in FIG. 1, comprises a series of external threads 21 which extend out of the open end of the sleeve 15 when the wedge 19 is in the position indicated by the phantom lines in FIG. 1.

As illustrated in FIG. 1, the deformable sidewall 17 of the sleeve 15 is expanded radially outward into fluid tight engagement with the inner periphery 11a of the heat exchanger tube 11 when the wedge 19 is pulled axially into the full line position in FIG. 1. To this end, an expandable annular ring 22 is mounted inside the sleeve chamber 18 adjacent its open end 15a. The ring 22 has an inner bore 22a which is tapered for slidably receiving the tapered outer surface of the wedge 19. The outer periphery 22b of the ring 22 is cylindrical, as is the inner periphery of the sleeve sidewall prior to expansion. The ring 22 is shorter in length than the sleeve 15, and is about ⅓ to about ½ of the length of the sleeve 15.

While the outer periphery of the deformable sidewall 17 of the sleeve 15 may be smooth, preferably, it has serrations provided by a series of closely spaced alternating deformable edges 25 and grooves 26 extending inwardly from the open end 15a of the sleeve 15. The edges 25 are arranged in spaced parallel planes disposed orthogonal to the central longitudinal axis A of the sleeve 15 in substantial registry with the expandable ring 22. The edges and grooves are provided by intersecting converging surfaces defining shallow V-shaped configurations providing a sawtooth-like pattern. The edges 25 cuts into any scale which may be present on the inner periphery 11a of the tube 11 and displaces the same into the grooves 26 as the sleeve sidewall 17 is expanded radially outward in the course of installation. Thus, the edges 25 and grooves 26 provide a labyrinth-like seal in the axial direction of the sleeve between the outer periphery of the sleeve 15 and the inner periphery of the tube 11. A more complete description of the details of the configuration and function of the alternating edges and grooves in a plug assembly may be obtained from copending U.S. application Ser. No. 311,912, filed on Oct. 16, 1981 and entitled "Plug Assembly for Use in Method and Apparatus for Repairing Heat Exchangers," the disclosure of which is incorporated by reference herein.

In order to pull the wedge 19 into the expandable ring 22 for expanding the deformable sleeve sidewall 17 outwardly, tension is applied axially to the wedge 19. Preferably, this is accomplished by means of a hydraulic ram connected to the threaded end 21 of the wedge 19 by means of a breakaway coupling which is threaded onto the threaded outer end 21 of the wedge 19. The hydraulic ram preferably is provided with a means for engaging the ring and/or the outer end of the sleeve 15 to hold the same in place in the tube 11 while tension is applied in the rightward direction (FIG. 1). The breakaway plug has a necked down, or reduced diameter, portion which is designed to rupture when a predetermined amount of tension is applied by the hydraulic ram. Thus, after the deformable sleeve sidewall 17 has been forced outwardly against the inner surface 11a of the tube 11 with a predetermined amount of pressure, tension on the breakaway coupling exceeds its design limit, thereby causing it to rupture. A preferred apparatus useful for this purpose is disclosed in copending application Ser. No. 214,189, filed on Dec. 8, 1980 for "Method and Apparatus for Repairing Heat Exchanger," now U.S. Pat. No. 4,393,564, the disclosure of which is incorporated by reference herein. Other types of breakaway couplings and tension applying devices are disclosed in U.S. Pat. Nos. 2,856,963 and 4,091,841.

The elements of the plug assembly described thus far provide an important sealing advantage. While both of the plug assemblies disclosed in the aforementioned copending applications function satisfactorily for most plugging applications, there exists multiple potential leak paths across each plug assembly. In the present invention, in contrast, the endwall 16 of the sleeve 15 cooperates with the deformable sidewall 17 to provide but a single annular axial leak path between the inner periphery 11a of the tube 11 and the sleeve 15. Accordingly, the potential for leakage is significantly reduced even with those plug assemblies of the present invention which do not have the preferred peripheral edges and grooves 25 and 26 which, as noted heretofore, further enhance the leak resistance by cutting and displacing any scale which may be present on the inner surface 11a of the tube 11.

While the elements of the plug assembly 10 described thus far provide a highly effective seal for many applications, there are certain applications, such as in nuclear power plants, where it is absolutely imperative that it be virtually impossible for the plug assembly to loosen and leak. To this end, means is provided for applying continuous tension to the wedge 19 for the purpose of maintaining radial outward pressure of the deformable sleeve sidewall 17 against the inner periphery 11a of the tube 11. In the present invention, the tensioning is provided by means of a locking assembly which includes a tubular retainer 32 which surrounds and extends axially along the body of the wedge 19 after it has been pulled axially out of the sleeve 15 as illustrated in FIG. 1. The retainer 32 has one end 32a which preferably engages both the outer end of the ring 22 and the outer end of the sleeve sidewall 17 but which may engage either the ring 22, the end of the sleeve 15, the end of the tube 11, or the tube sheet 12. The retainer 32 has at its opposite end a shoulder 32b which is disposed transversely with respect to the axis A of the wedge 19. A rotary member, in the present instance a nut 35, engages the threads 21 on the narrow end of the wedge 19 and has wrench flats to enable it to be rotated with respect to the wedge 19. Thus, when the nut 35 is installed and rotated clockwise in FIG. 3, it applies compression to the retainer 32 and simultaneously applies tension to the wedge 19. As a result, the wedge 19 interacts with the expandable ring 22 and the deformable sidewall 17 of the sleeve 15 to maintain continuous outward pressure of the sleeve 15 against the inner periphery 11a of the tube 11. The nut 35 may then be permanently secured in its tightened position as by means of weldments 36 between the wedge threads 21 and the nut 35.

The locking assembly comprising the retainer 32 and nut 35 cooperates with the other elements of the plug assembly to maintain continuous outward pressure between the sleeve 15 and the tube 11. This continuous pressure is important in accommodating slight dimensional variations which may be created between the plug and tube by thermal expansion and contraction during start-up and shut-down and accommodating excessive relaxation in stresses such as may occur during stress relieving the heat exchanger after it has been repaired.

Figure 3:
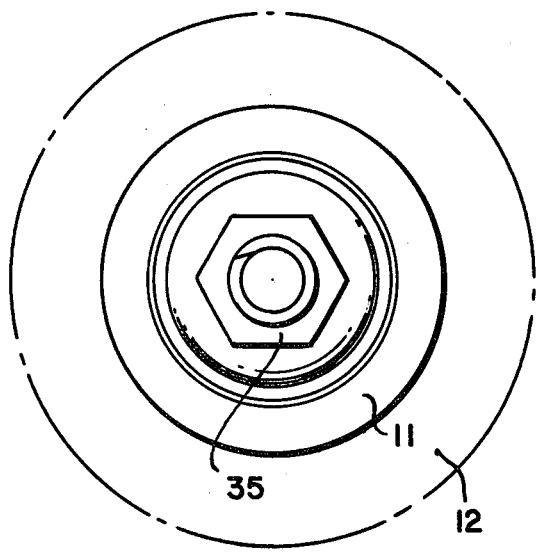
FIG. 3 is an end elevational view taken on line 3—3 of FIG. 1.
Figure 2:
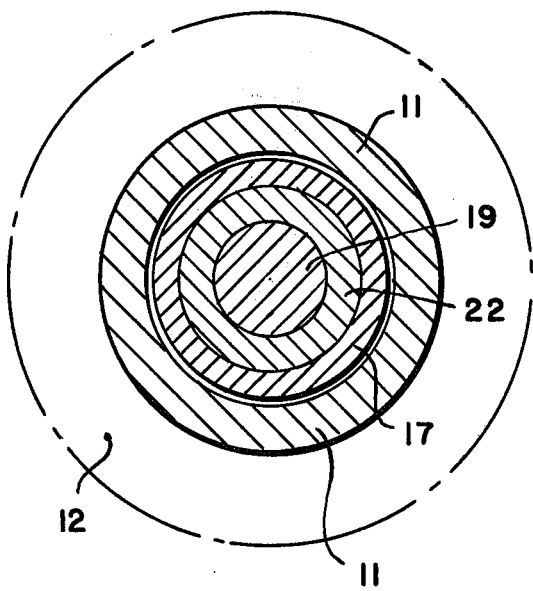
FIG. 2 is a sectional view taken on line 2—2 of FIG. 1.

In the embodiment illustrated in FIGS. 1-3, the rotary locking member includes the nut 35 which engages the threads 21 on the exterior of the wedge 19. If desired, a modified plug assembly utilizing a bolt instead of a nut to provide the desired tension may be provided. To this end, a modified embodiment illustrated in FIG. 4 comprises a sleeve 115 having an endwall 116 and a deformable sidewall 117 integral therewith. A frusto-conical wedge 119 is mounted in the chamber formed between the endwall 116 and side wall 117 and is slidably received in an expandable ring 122. An internally threaded bore 130 extends inwardly from the smaller end 119' of the wedge 119 for receiving the threads of a breakaway coupling as described heretofore and, after removal of the breakaway coupling, for receiving the threads of a bolt (not shown) used to tension the wedge 119 after it has been pulled axially to expand the ring 122 and the deformable sidewall 117. As in the embodiment of FIG. 1, a plurality of axially spaced edges 125 and grooves 126 alternate in the outer periphery of the sidewall 117 of the sleeve 115 in registry with the ring 122. Thus, after the wedge 119 has been pulled outwardly, such as in the manner illustrated in FIG. 1, the retainer sleeve 32 may be placed around the wedge 119 and a bolt threaded into the threads 130. Rotation of the bolt and engagement of its head with the shoulder 32a of the retainer 32 compresses the retainer 32 and tensions the wedge 119 for providing the continuous outward sealing pressure noted heretofore.

Figure 4:
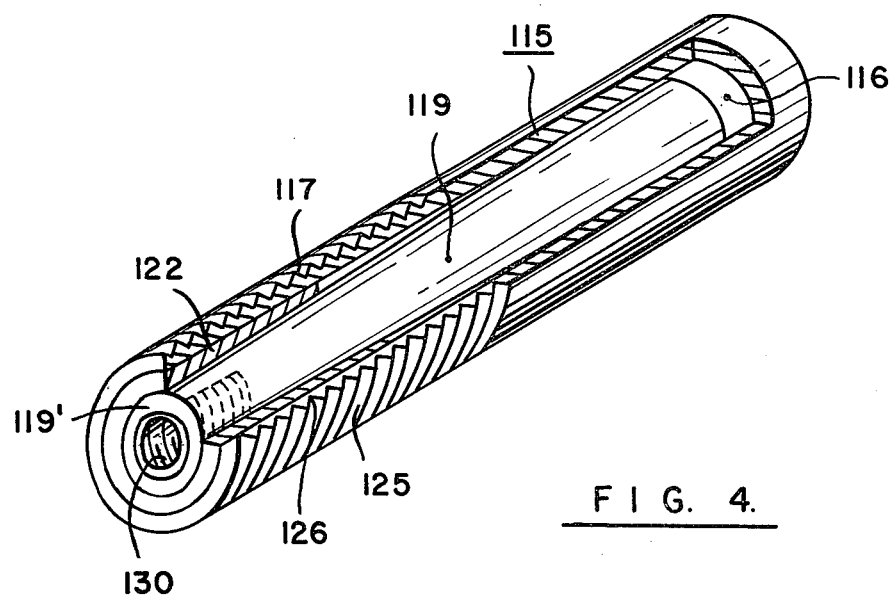
FIG. 4 is a perspective view of a modified plug assembly with portions having been broken away to expose certain details of construction.

Both of the plug assemblies of the present invention are assembled by first inserting the wedge into the sleeve to provide an assembly such as illustrated in FIG. 4. Thereafter, the expandable ring is pressed into the space between the inner periphery of the sleeve sidewall and the outer periphery of the wedge. Prior to assembly, the wedge and sleeve are annealed to relieve stresses which may have been generated in the course of manufacture. In the embodiment of FIG. 4, the outer end of the ring 122 is disposed about flush with the open end of the sleeve 115 and with the small end 119' of the wedge 119. In the embodiment of FIGS. 1-3, the threads 21 on the wedge 19 are left exposed for connection to the breakaway coupling.

Preferably, the sleeve, expandable ring and wedge of each plug assembly are each fabricated of the same metal. The metal selected for each of these elements is preferably the same as the metal from which the heat exchanger tube has been formed in order to reduce the possibility of galvanic action and hence corrosion and to have the same coefficient of thermal expansion. For instance, if the heat exchanger tube is fabricated of brass, the sleeve, expandable ring and wedge should each be fabricated of brass. Preferred metals in addition to brass include: cold rolled steel, stainless steel, and nickel.

By way of example, and not by way of limitation, plug assemblies fabricated in accordance with the present invention have been tested and found capable of resisting leakage under substantial pressures. In one test, a plug assembly having a sleeve outside diameter of 0.625 inches, a sleeve inside diameter of 0.375 inches, and an overall sleeve length of 2.50 inches was installed in a tube having an inside diameter of 0.634 inches. The sleeve had V-shaped grooves and edges spaced apart uniformly with about 12 edges and grooves per inch of axial length of the sleeve for a distance of about 1.0 inches in from the open end of the sleeve to provide the sawtooth-like pattern described heretofore. The depths of the grooves were about 0.050 inches. The wedge had a tapered surface length of 2.0 inches and an included cone angle of 3 degrees. The expandable ring has a length of 1.0 inch. The plug assembly was fabricated of metal. When installed and tested, this plug assembly was found to be capable of resisting fluid pressure in excess of 5,000 psi. without leaking.

In view of the foregoing, it should be apparent that the present invention now provides improved plug assemblies which are resistant to leakage even though the plugged structure may be subjected to substantial pressures and to dimensional changes such as caused by thermal expansion and contraction or by stress relief. The plug assemblies can be used effectively even in tubes having interior scale. The locking means ensures that the plug assemblies provide a leak resistant joint over a wide range of conditions, thereby making it particularly suited for use in nuclear engineering applications.

While preferred embodiments of the present invention have been described in detail, various modifications, alterations and changes may be made without departing from the spirit and scope of the present invention as defined in the appended claims.

I claim:

1. For use in plugging a tube having a hole, an expandable plug assembly, comprising:

a sleeve having a longitudinal axis with an endwall and a deformable tubular sidewall surrounding said endwall for cooperating therewith to form a chamber closed at one end and open at its opposite end, said sleeve having a plurality of cutting edges formed integral therewith and defined by V-shaped intersecting converging surfaces providing a slender deformable tip and a series of shallow grooves therebetween, a wedge contained within said chamber, a separate expandable ring mounted in said chamber and having a tapered bore slidably receiving said wedge, said wedge, when pulled axially of the chamber, cooperating with the ring to expand the same and thereby to expand the tubular sidewall of the sleeve outwardly whereby the cutting edges cooperate with the tube to define a labyrinth seal along the outer periphery of the sleeve.

2. The plug assembly according to claim 1 wherein said plurality of edges extend around the periphery of said sidewall adjacent to said open end.

3. The plug assembly according to claim 2 wherein said edges and grooves are disposed in axially spaced parallel planes normal to the longitudinal axis of the sleeve.

4. The plug assembly according to claim 1 wherein said wedge has a small end protruding from said open end of said sleeve and a large end disposed within said chamber, and including means on said small end of said wedge providing a gripping surface to enable said wedge to be pulled relative to said ring and sleeve.

5. The plug assembly according to claim 1 including locking means engageable with said wedge to apply locking tension to said wedge for maintaining continuous outward pressure on the sidewall of said sleeve.

6. The plug assembly according to claim 5 wherein said locking means includes a tubular retainer having one end engaging said ring and having an opposite end with a shoulder, said retainer surrounding said wedge after the wedge has been pulled axially outward of said sleeve, and means engaging said shoulder and said wedge for applying said locking tension.

7. The plug assembly according to claim 6 wherein said wedge has threads, and said means engaging said shoulder includes a rotary member operable upon rotation relative to said retainer to apply said locking tension.

8. The plug assembly according to claim 7 wherein said threads are external to said wedge, and said rotary member includes a nut engaging said threads and said shoulder of said retainer.

9. A plug assembly for use in plugging a tube, comprising:
- a sleeve having an endwall and an integral radially-deformable tubular sidewall surrounding said endwall for cooperating therewith to form a chamber closed at one end and open at its opposite end,
- said sleeve having an outer periphery with a plurality of alternating substantially V-shaped intersecting surfaces defining slender deformable cutting edges and grooves,
- a frusto-conical wedge mounted in said chamber, said wedge having a large end confronting the endwall of the sleeve and a small end adjacent to the open end of the sleeve,
- an annular expandable ring mounted in said chamber adjacent to said open end in substantial registry with said grooves and edges, said ring having a bore slidably receiving said wedge,
- said wedge adapted, when pulled axially outward of said chamber, to expand said ring and said sidewall of said sleeve to deform the same radially outwardly, whereby the cutting edges and the tube form a labyrinth-like seal around the outer periphery of said sleeve, and
- means engaging said small end of said wedge for tensioning said wedge and thereby applying continuous outward pressure to said sidewall of said sleeve.

10. The plug assembly according to claim 9 wherein said tensioning means includes a tubular retainer having one end engaging said ring and having a shoulder at its opposite end, said tubular retainer surrounding said wedge after said wedge has been pulled a predetermined distance out of said sleeve, a rotary member engaging said retainer shoulder and rotatable about an axis coaxial with the path of movement of said wedge, and interengaged thread means on said rotary member and said wedge cooperable to apply said tension upon rotation of said rotary member.

11. The plug assembly according to claim 10 wherein said interengaged threaded means includes external threads on said wedge and a nut providing internal threads on said rotary member.

12. The plug assembly according to claim 11 including means permanently bonding said nut to said wedge to prevent reverse rotation of said nut.

13. For use in plugging a tube, an expandable plug assembly, comprising:
- a sleeve having a longitudinal axis with an endwall and a deformable tubular sidewall surrounding said endwall for cooperating therewith to form a chamber closed at one end and open at its opposite end,
- a wedge contained within said chamber and having an outer end,
- a separate expandable ring mounted in said chamber adjacent said open end and having a tapered bore slidably receiving said wedge,
- said wedge, when pulled axially of the chamber, having its outer end extended beyond said ring for cooperating therewith to expand the same and thereby to expand the tubular sidewall of the sleeve outwardly adjacent its open end, and
- locking means surrounding said extended portion of said wedge for receiving the same and extending axially between the outer end of said wedge and said ring for engaging the same to apply locking tension to the wedge and thereby continuously maintaining outward pressure around the periphery of said sleeve.

* * * * *